G. P. WERN.
CLUTCH FOR HOISTING ENGINES.
APPLICATION FILED APR. 29, 1913.
1,137,939.
Patented May 4, 1915.
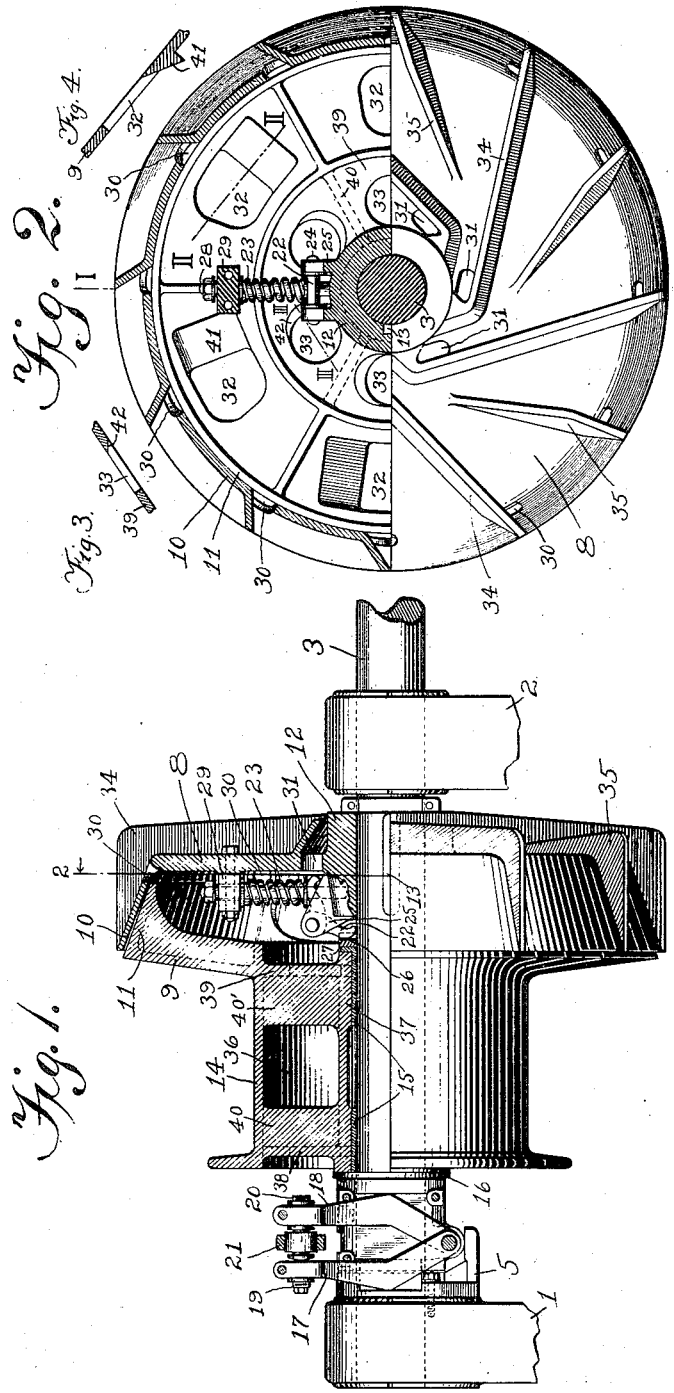
WITNESSES:
A. Rozinsky
A. Flattner
INVENTOR.
Gustav P. Wern,
BY
Lewis J. Doolittle
ATTORNEY.

UNITED STATES PATENT OFFICE.

GUSTAV PERS. WERN, OF NEW YORK, N. Y.

CLUTCH FOR HOISTING-ENGINES.

1,137,939.   Specification of Letters Patent.   Patented May 4, 1915.

Application filed April 29, 1913. Serial No. 764,369.

*To all whom it may concern:*

Be it known that I, GUSTAV P. WERN, a citizen of the United States, residing in the city, county, and State of New York, United States of America, have invented certain new and useful Improvements in Clutches for Hoisting-Engines, of which the following is a specification.

The present invention has reference to friction clutches of the conical type, wherein two members mounted on the same shaft, one loose and the other fixed, are brought together and rotated simultaneously by frictional contact.

One of the objects of the invention is to provide an improved construction for the clutch members, which will automatically set up currents of air passing over both their inner and outer surfaces, as well as through them, whenever either or both of the members are being revolved, thereby producing self-ventilation of the clutch and cooling its component parts, irrespective of the stress and friction imposed upon the coöperating elements under any and all conditions of manipulation.

A further object is to produce a spring-actuated repelling mechanism adapted to separate the clutch members, which will be powerful in operation and possessed of greater flexibility than has hitherto been available.

The drawing hereto annexed illustrates a preferred form of the invention. Like parts in the several views are given the same reference numerals.

Figure 1 is a side view, showing one-half of the clutch in section, from line 1 of Fig. 2. Fig. 2 is an end view of Fig. 1, one-half of the clutch being shown in section along the line 2 of Fig. 1. Figs. 3 and 4 are partial sections of Fig. 2, respectively taken on the lines 3—3 and 2—2 thereof, illustrating the conformation of parts at the places indicated.

Referring specifically to the said figures, the numerals 1 and 2 represent supports provided with suitable bearings for a rotary shaft 3 journaled therein. The clutch proper consists of two disk-shaped, conical members 8 and 9, peripherally flanged at 10 and 11, to fit one within the other. The flange 10 of the disk or member 8 is made flaring, and the flange 11 of the disk or member 9 tapering, as shown in Fig. 1, so as to adapt the latter for entrance into the former and provide oppositely-inclined surfaces for gradual interengagement by frictional contact, in the well-known manner. The disk 8 has a hub 12, keyed on the shaft 7, as at 13, whereby this member of the clutch is fixed to the shaft and caused to revolve therewith at the same rate of speed. On the other hand, the disk 9 is intended to be unaffected normally by the rotation of the shaft, but may be connected with any rotatable mechanical element upon which the power of the clutch is meant to be exerted. In the present embodiment of the invention, the disk 9 is made part of and integral with a cable winding drum 14.

As shown, the bore of the aforesaid drum is preferably lined throughout with a bushing 15, fitted loose on the shaft 7, to render the drum independent of the latter and allow it a slight longitudinal movement thereon, sufficient to effect a clearance between the contacting surfaces of the flanges 10 and 11 of the disks 8 and 9, when it is desired that these two clutch-members should be disengaged, as shown in Fig. 1. A clutch-operating mechanism, including a collar 16, and jointed arms 17 and 18 for sliding it on the shaft against the outer end of the drum, is provided to cause the engagement of the said surfaces whenever required. This mechanism is specifically described and claimed in a companion application filed herewith, and it is not necessary to set forth its structural characteristics in detail in the present application. The mechanism is bracketed upon the support 5 and is actuated by right and left screws 19 and 20, fixed upon a common axis and respectively engaging the separated ends of the arms 17 and 18. These ends of the arms are spread apart or drawn toward each other by turning the screws one way or the other, and consequently operate either to force the sliding collar 16 against the outer end of the drum or retract it therefrom. The turning of the screws may be effected by a lever or handle-bar having an eye or a fork at one end, as indicated at 21.

In order to keep the clutch members apart in their inoperative positions, the fixed member 8 is equipped with a repelling mechanism of novel construction designed to act upon the loose member 9. This repelling mechanism comprises a bell-crank lever 22, and a compression-spring 23 located in the space inclosed by the overlapping flanges 10 and 11 of the clutch members. The bell-crank lever is fulcrumed on a pivot-pin 24, held in a pair of lugs 25, projecting from the hub 12 of the disk 8. One arm of the lever 22 abuts against a ring 26, which adjoins and bears upon a flange 27 on the inner end of the bushing 15. The other arm of the bell-crank lever 22 is engaged by a compression-spring 23 which preferably is coiled around a threaded rod 28, held at one end in the hub 12 at its other end by a block 29, attached to the disk 8. The spring 23, therefore, is located radially with relation to the disk and perpendicular to the shaft 3. This arrangement, it will be observed, affords more room for the spring and makes possible the use of a spring of increased length in a given space between disks and, as a consequence, insures greater flexibility. The provision of the bell-crank form of lever makes it possible to operate the clutch with one instead of a plurality of springs, as the combined power and purchase of the lever and spring is ample ordinarily to accomplish the intended object of separating, or keeping separate, the two clutch members, as may be required in practice.

For the purpose of effecting the ventilation and cooling of parts hereinbefore spoken of, the disk 8 is formed or provided with orifices, such as 30 and 31, and the disk 9 is provided with similar apertures 32 and 33.

The orifices 30 and 31 are arranged in two concentric circular series, preferably located, one series in the flange 10 at or near the base thereof and the other series in the central portion of the disk 8, adjacent its hub 12. The number of orifices in the series 30 is conveniently made double that in the series 31, owing to the distance between their respective circles.

Two sets of ribs 34 and 35, of different lengths are also formed or provided on the external surface of the disk 8. The longer ribs 34 extend from the hub 12 outwardly to the edge of the disk 8, and thence over and out to the rim of the flange 10. The shorter ribs 35 start from points intermediate of the ribs 34 but likewise reach out to the disk's edge and to the flange's margin beyond. At their inner ends, the said ribs 34 project radially from the hub 12 between the several orifices 31 of the inner series, but as they pass them on one side the ribs 34 are inclined in, along another, adjacent side of the orifices 31, and thence are brought out to the outer series of orifices 30 on lines that are tangential to an imaginary circle drawn concentric with the hub 12 and shaft 7, to which the hub 12 is keyed. Two orifices, one in the series 30 and the other in the series 31, are thus positioned on one side of each rib 34 and within the bend of each. Each rib 34 is also inclined laterally or edgewise over the two orifices 30 and 31 by the side of which it extends. The ribs 35 are placed similarly to the bent portions of the ribs 34 and likewise inclined to one side, but they pass by only the intermediate orifices of the outer series 31 which are not reached by the longer ribs. The shorter ribs are provided for the latter-named orifices and divide, into substantially equal parts, the spaces intervening between the other orifices in the same series.

The apertures 32 and 33, hereinbefore mentioned, are disposed also in two series, circularly and concentrically, the outer series 32 occurring in the disk 9, and the inner series 33 in the inner end of the drum 14, a similar series being provided in the outer wall 38. The drum 14 is hollow, as indicated at 36 in Fig. 1, consisting of a cylindrical shell supported from a central sleeve 37 by end walls 38 and 39 and intermediate braces 40 and 40'. The outer wall 38 and the inner wall 39 is thickened and beveled, as at 41 in Fig. 4, on the side of the outer series of apertures 32 therein which is nearest to the inclined edge of the ribs 34, 35, as the same appear in Fig. 2. The inner series of apertures 33, in the wall 39, are beveled similarly in the same direction, as shown at 42 in Fig. 3.

It will now be understood that by revolving the shaft 7 and disk 8 thereon in the direction in which the ribs 34 and 35 are bent (that is to say, contra-clockwise with relation to Fig. 2), a considerable percentage of the air caught by and between the inclined, bent-in portions of the said ribs will naturally be directed centerward along these ribs and be forced and also sucked in through the two series of orifices 30 and 31, causing strong currents of air to pass between the disks 8 and 9 through the apertures 32 in the latter disk and into the hollow drum by way of the apertures 33, and also between the lapped flanges 10 and 11, whenever they are released one from the other. Part of this air is reflected backward by the closed end of the drum, and thereupon sets up a counter-current in the opposite direction. This agitation of the air is constant so long as the shaft is being revolved, whether the hoisting drum be in or out of clutch, and exerts a most beneficial action, particularly in keeping the clutch-members cool at all times, regardless of the amount of friction to which their contacting surfaces are subjected.

What I claim is:

1. In a clutch, the combination of two members slidable one toward the other, a bell-crank lever carried by one member adapted to press normally against the other member, and a radially disposed spring designed to actuate said bell-crank lever.

2. In a clutch, the combination of a relatively fixed rotary member, a loose member revoluble by frictional contact therewith, and a spring-actuated bell-crank lever carried by the rotary member and abutting against the loose member, said lever operating normally to keep said members separate.

Signed at New York city, N. Y., in the county and State of New York, this 12th day of June, 1912.

GUST. PERS. WERN.

Witnesses:
LEWIS J. DOOLITTLE,
LUELLA F. LITTLE.